US012217654B2

(12) United States Patent
Hwang et al.

(10) Patent No.: US 12,217,654 B2
(45) Date of Patent: Feb. 4, 2025

(54) ELECTROLUMINESCENCE DISPLAY APPARATUS REDUCING NUMBER OF GATE LINES IN DOUBLE RATE DRIVING

(71) Applicant: LG Display Co., Ltd., Seoul (KR)

(72) Inventors: In Su Hwang, Seoul (KR); Dong Ik Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/389,197

(22) Filed: Jul. 29, 2021

(65) Prior Publication Data

US 2022/0036813 A1 Feb. 3, 2022

(30) Foreign Application Priority Data

Jul. 30, 2020 (KR) ........................ 10-2020-0095284

(51) Int. Cl.
*G09G 3/32* (2016.01)

(52) U.S. Cl.
CPC ....... *G09G 3/32* (2013.01); *G09G 2300/0439* (2013.01); *G09G 2300/0852* (2013.01); *G09G 2310/0267* (2013.01); *G09G 2310/0275* (2013.01); *G09G 2310/08* (2013.01)

(58) Field of Classification Search
CPC .......... G09G 3/30; G09G 3/32; G09G 3/3208; G09G 3/3216; G09G 3/3222; G09G 3/3225; G09G 3/3233; G09G 3/3241; G09G 3/325; G09G 3/3258; G09G 3/3266; G09G 3/3275; G09G 3/3283; G09G 3/3291; G09G 2300/0439
USPC ....................................................... 345/76–83
See application file for complete search history.

(56) References Cited

U.S. PATENT DOCUMENTS

| | | | | |
|---|---|---|---|---|
| 11,257,432 B2 * | 2/2022 | Yuan | G09G 3/3291 |
| 11,308,865 B2 * | 4/2022 | Hwang | G09G 3/2003 |
| 2010/0123713 A1 * | 5/2010 | Joo | G09G 3/3233 345/76 |
| 2015/0138052 A1 * | 5/2015 | Iida | G09G 3/3233 345/76 |

(Continued)

FOREIGN PATENT DOCUMENTS

| | | |
|---|---|---|
| CN | 106531084 A | 3/2017 |
| CN | 106710525 A | 5/2017 |

(Continued)

*Primary Examiner* — Ke Xiao
*Assistant Examiner* — Nelson Lam
(74) *Attorney, Agent, or Firm* — Seed IP Law Group LLP

(57) ABSTRACT

An electroluminescence display apparatus includes a first pixel, a second pixel disposed adjacent to the first pixel in a horizontal direction to share a data line to which a first data voltage and a second data voltage are time-divisionally supplied and a reference voltage line to which a reference voltage is supplied, along with the first pixel, a first gate line coupled to the first pixel to transfer a first gate control signal, corresponding to the reference voltage, to the first pixel, a second gate line coupled to the first and second pixels in common to transfer a second gate control signal, corresponding to the first data voltage and the reference voltage in common, to the first and second pixels, and a third gate line coupled to the second pixel to transfer a third gate control signal, corresponding to the second data voltage, to the second pixel.

8 Claims, 12 Drawing Sheets

(56) References Cited

U.S. PATENT DOCUMENTS

| | | | | |
|---|---|---|---|---|
| 2016/0125801 | A1* | 5/2016 | Chung | G09G 3/3233<br>345/78 |
| 2016/0203766 | A1* | 7/2016 | Soni | G09G 3/3258<br>345/77 |
| 2017/0221419 | A1* | 8/2017 | Xiang | G09G 3/3233 |
| 2017/0221423 | A1* | 8/2017 | Xiang | G09G 3/3266 |
| 2017/0309229 | A1* | 10/2017 | Asano | G09G 3/3648 |
| 2021/0201787 | A1* | 7/2021 | Yuan | H10K 59/121 |
| 2022/0028330 | A1* | 1/2022 | Hwang | G09G 3/2003 |

FOREIGN PATENT DOCUMENTS

| | | | |
|---|---|---|---|
| CN | 109698225 | A | 4/2019 |
| KR | 10-2011-0112380 | A | 10/2011 |

* cited by examiner

ELECTROLUMINESCENCE DISPLAY APPARATUS REDUCING NUMBER OF GATE LINES IN DOUBLE RATE DRIVING

CROSS-REFERENCE TO RELATED APPLICATION(S)

This application claims the benefit of Korean Patent Application No. 10-2020-0095284, filed on Jul. 30, 2020, which is hereby incorporated by reference as if fully set forth herein.

BACKGROUND

Technical Field

The present disclosure relates to an electroluminescence display apparatus.

Description of the Related Art

Electroluminescence display apparatuses are categorized into inorganic light emitting display apparatuses and electroluminescence display apparatuses on the basis of a material of a light emitting layer. Each of a plurality of pixels of the electroluminescence display apparatuses includes a light emitting device self-emitting light and controls the amount of light emitted by the light emitting device on the basis of a gray level of image data to adjust luminance. A pixel circuit of each pixel may include a driving transistor which transfers a pixel current to the light emitting device and at least one switching transistor and capacitor, which program a gate-source voltage of the driving transistor.

The electroluminescence display apparatuses are progressively advancing in high resolution. In a high-resolution model, a double rate driving type (hereinafter referred to as a DRD) is applied for securing a tap interval between source integrated circuits (ICs) configuring a data driver and for reducing the manufacturing cost. According to the DRD, two pixels disposed adjacent to each other in a horizontal direction with one data line therebetween share one data line, and the two pixels are sequentially driven by a data voltage supplied through the data line. In a case where the DRD is applied, in addition to the number of output channels of the data driver, the number of data lines connected to the output channels of the data driver is reduced by ½ compared to the number of pixels included in a set of pixels of one pixel line (where the one pixel line denotes a set of pixels disposed adjacent to one another in a horizontal direction), and thus, a process margin may be secured and the manufacturing cost may be reduced.

BRIEF SUMMARY

Despite some benefits with the DRD, the inventors of the present disclosure have recognized various short comings with some of the approaches in the related art. For example, when the DRD is applied, the number of gate lines may increase by twice compared to a case where the DRD is not applied. This is because driving timings of two pixels sharing a data line should be temporally divided. Further, a gate line is connected to a gate driver. Because a circuit size of the gate driver and a mounting area thereof increase when the number of gate lines increases, a design area is insufficient, and due to this, a panel design may be limited and a bezel area may increase in a display panel. Such problems may more increase in an internal compensation pixel structure (e.g., a pixel structure which includes a plurality of switching transistors and where an electrical characteristic change of a driving transistor is compensated for in a pixel circuit).

To overcome the aforementioned problem of the related art as well as other technical problems present in the related art, the present disclosure may provide an electroluminescence display apparatus in which an increase in the number of gate lines is reduced or minimized despite a DRD internal compensation method.

To achieve these technical benefits and other advantages and in accordance with the purpose of the disclosure, as embodied and broadly described herein, a sensing device includes a sensing channel terminal connected to a pixel through a sensing line, a first power terminal to which a displaying reference voltage is input, wherein, in 1 sensing sequence in which a scan signal applied to the pixel is maintained in an on-level, the first sampling switch and the second sampling switch are alternately and selectively turned on.

In another aspect of the present disclosure, an electroluminescence display apparatus includes a first pixel, a second pixel disposed adjacent to the first pixel in a horizontal direction to share a data line to which a first data voltage and a second data voltage are time-divisionally supplied and a reference voltage line to which a reference voltage is supplied, along with the first pixel, a first gate line connected to the first pixel to transfer a first gate control signal, corresponding to the reference voltage, to the first pixel, a second gate line connected to the first and second pixels in common to transfer a second gate control signal, corresponding to the first data voltage and the reference voltage in common, to the first and second pixels, and a third gate line connected to the second pixel to transfer a third gate control signal, corresponding to the second data voltage, to the second pixel.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
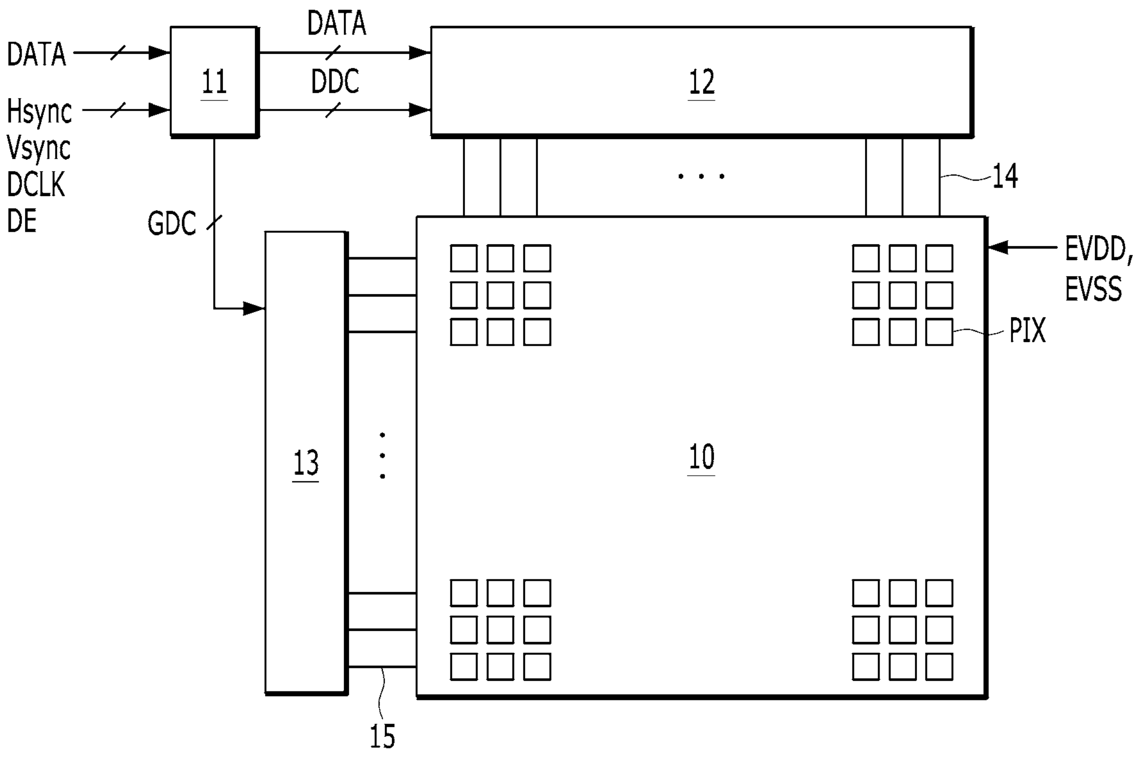
FIG. 1 is a block diagram illustrating an electroluminescence display apparatus according to an embodiment of the present disclosure.

Hereinafter, embodiments of the present disclosure will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present disclosure, the detailed description will be omitted.

In an electroluminescence display apparatus, a pixel circuit may include one or more of an N-channel transistor (NMOS) and a P-channel transistor (PMOS). A transistor may be a three-electrode element which includes a gate, a source, and a drain. The source may be an electrode which supplies a carrier to the transistor. In the transistor, a carrier may start to flow from the source. The drain may be an electrode which allows the carrier to flow out from the transistor. In the transistor, the carrier may flow from the source to the drain. In the N-channel transistor, because a carrier is an electron, a source voltage may have a lower voltage than a drain voltage so that the electron flows from the source to the drain. In the N-channel transistor, a current may flow from the drain to the source. In the P-channel transistor, because a carrier is a hole, a source voltage may be higher than a drain voltage so that the hole flows from the source to the drain. In the P-channel transistor, because the hole flows from the source to the drain, a current may flow from the source to the drain. It should be noted that a source and a drain of a transistor are not fixed. For example, the source and the drain may switch therebetween on the basis of a voltage applied thereto. Therefore, the present disclosure is not limited by a source and a drain of a transistor.

A scan signal (or a gate signal) applied to pixels may swing between a gate-on voltage and a gate-off voltage. The gate-on voltage may be set to a voltage which is higher than a threshold voltage of a transistor, and the gate-off voltage may be set to a voltage which is lower than the threshold voltage of the transistor. The transistor may be turned on in response to the gate-on voltage, and in response to the gate-off voltage, the transistor may be turned off. In an N-channel transistor, the gate-on voltage may be a gate high voltage (VGH), and the gate-off voltage may be a gate low voltage (VGL). In a P-channel transistor, the gate-on voltage may be the gate low voltage (VGL), and the gate-off voltage may be the gate high voltage (VGH).

FIG. 1 is a block diagram illustrating an electroluminescence display apparatus according to an embodiment of the present disclosure.

Referring to FIG. 1, the electroluminescence display apparatus according to an embodiment of the present disclosure may include a display panel 10, a timing controller 11, a data driver 12, a gate driver 13, and a power circuit (not shown). In FIG. 1, all or some of the timing controller 11, the data driver 12, and the power circuit may be integrated into a drive integrated circuit (IC) and may be provided as one body.

In a screen displaying an input image in the display panel 10, a plurality of first signal lines 14 extending in a column direction (or a vertical direction) and a plurality of second signal lines 15 extending in a row direction (or a horizontal direction) may overlap with one another, and a plurality of pixels PIX may be arranged as a matrix type to configure a pixel array in a plurality of overlapping areas. The first signal lines 14 may include a plurality of data lines to which data voltages are supplied and a plurality of reference voltage lines to which a reference voltage is supplied. The second signal lines 15 may include a plurality of gate lines to which gate control signals are supplied.

The pixel array may include a plurality of pixel lines. Here, the pixel line may not denote a physical signal line but may be defined as a pixel set or a pixel block including pixels of one line arranged adjacent to one another in a horizontal direction. The plurality of pixels PIX may be grouped into a plurality of pixel groups and may display various colors. When a pixel group for displaying a color is defined as a unit pixel, one unit pixel may include a red (R) pixel, a green (G) pixel, and a blue (B) pixel, and moreover, may further include a white (W) pixel. In the following embodiment, an example where one unit pixel is implemented with R, G, B, and W pixels will be described.

Each of the pixels PIX may include a light emitting device and a driving element which generates a pixel current on the basis of a gate-source voltage to drive the light emitting device. The light emitting device may include an anode electrode, a cathode electrode, and an organic compound layer formed therebetween. The organic compound layer may include a hole injection layer (HIL), a hole transport layer (HTL), an emission layer (EML), an electron transport layer (ETL), and an electron injection layer (EIL), but is not limited thereto. When the pixel current flows in the light emitting device, a hole passing through the hole transport layer (HTL) and an electron passing through the electron transport layer (ETL) may move to the emission layer (EML) to generate an exciton, and thus, the emission layer (EML) may emit visible light.

The driving element may be implemented as a thin film transistor (TFT). An electrical characteristic (for example, a threshold voltage, electron mobility, and the like) of a driving transistor should be uniform in all pixels, but may have a difference which occurs between the pixels PIX due to a process deviation and an element characteristic deviation. The electrical characteristic of the driving transistor may be changed as a display driving time elapses, and due to this, the degree of degradation may have a difference between the pixels PIX. In order to compensate for an electrical characteristic deviation of the driving transistor, an internal compensation method may be applied to the electroluminescence display apparatus. The internal compensation method may compensate for the electrical characteristic deviation of the driving transistor by using an internal compensator included in a pixel circuit of each pixel so that an electrical characteristic change of the driving transistor does not adversely affect the emission current. The internal compensator may include a plurality of switching elements, each implemented as a TFT, and at least one capacitor.

Research for implementing some transistors (for example, a switching element where a source or a drain thereof is connected to a gate of the driving element) of the pixel circuit by using an oxide transistor is increasing. The oxide transistor may include a semiconductor material, and for example, may include oxide such as indium gallium zinc oxide (IGZO) instead of polysilicon. The oxide transistor may have electron mobility, which is 10 or more times the electron mobility of an amorphous silicon transistor, and may be far lower in manufacturing cost than the LTPS transistor. Also, because an off current of the oxide transistor is low, the driving stability and reliability of the oxide transistor may be high in low-speed driving where an off period of a transistor is relatively long. Accordingly, the oxide transistor may be applied to organic light emitting diode (OLED) televisions (TVs) which need a high resolution and low-power driving or do not implement a suitable screen size through an LTPS process.

A plurality of touch sensors may be disposed on the pixel array of the display panel 10. A touch input may be sensed by using separate touch sensors, or may be sensed through pixels. The touch sensors may be implemented as in-cell type touch sensors which are embedded into the pixel array or are disposed on a screen of the display panel 10 in an on-cell type or an add-on type.

In the pixel array, the pixels PIX may be driven by a DRD internal compensation method. In order to implement the DRD internal compensation method, pixels disposed on the same pixel line may be grouped into a plurality of pixel groups each including two pixels, and two pixels included in the same pixel group may share one data line 14. In pixels PIX provided in the same pixel line, pixels disposed to the left with respect to the shared data line 14 may be defined as first pixels, and pixels disposed to the right with respect to the shared data line 14 may be defined as second pixels. In this case, some of gate lines corresponding to pixels of one pixel line may be selectively connected to one of the first and second pixels, and thus, a driving timing of each of the first pixels and a driving timing of each of the second pixels may be temporally divided based on the DRD internal compensation method. Particularly, the other gate lines may be connected to the first and second pixels in common, and thus, a side effect (e.g., a drawback where the number of gate lines increases) occurring when the DRD internal compensation method is applied may be solved. Furthermore, some of the gate lines may be connected to one pixel provided in another pixel line, and thus, the number of gate lines may be more reduced. According to the present disclosure, despite the DRD internal compensation method being applied, the number of gate lines for driving may be reduced, and thus, a panel design limitation may decrease and a bezel size may be reduced or minimized.

The pixel array may further include a plurality of high level power lines to which a high level source voltage EVDD is supplied and a plurality of low level power lines to which a low level source voltage EVSS is supplied. Also, the low level power lines may be implemented as a common electrode type where the low level power lines are disposed on or under the light emitting device and are connected to the light emitting device.

The high level power lines and the low level power lines may be connected to the power circuit. By using a DC-DC converter, the power circuit may adjust a direct current (DC) input voltage provided from a host system to generate a gate-on voltage (VGH) and a gate-off voltage (VGL) for an operation of each of the data driver 12 and the gate driver 13 to generate the high level source voltage EVDD and the low level source voltage EVSS for driving of the pixel array. The reference voltage for initializing a source voltage of the driving element in the pixel PIX may be set to be higher than the low level source voltage EVSS. However, in order to prevent the light emitting device from emitting undesired light in performing internal compensation, a difference voltage between the reference voltage and the low level source voltage EVSS may be set to be lower than an operation point voltage of the light emitting device.

As described above, the pixels PIX may be supplied with the high level source voltage EVDD and the low level source voltage EVSS from the power circuit and may be supplied with the data voltages and the reference voltage from the data driver 12. First and second embodiments may be implemented based on a connection configuration between the first and second signal lines 14 and 15 and the pixel PIX. The first embodiment will be described below with reference to FIGS. 4 to 11, and the second embodiment will be described below with reference to FIGS. 12 to 25.

The timing controller 11 may provide the data driver 12 with digital image data DATA transferred from a host system (not shown). The timing controller 11 may receive a timing signal, including a vertical synchronization signal Vsync, a horizontal synchronization signal Hsync, a data enable signal DE, and a dot clock DCLK, from the host system to generate a plurality of timing control signals for an operation timing of each of the data driver 12 and the gate driver 13. The timing control signals may include a gate timing control signal GDC for controlling an operation timing of the gate driver 13 and a data timing control signal DDC for controlling an operation timing of the data driver 12.

The data driver 12 may sample and latch the digital image data DATA input from the timing controller 11 on the basis of the data timing control signal DDC to generate parallel data, and a digital-to-analog converter (DAC) may convert the digital image data DATA into analog data voltages on the basis of a gamma reference voltage and may supply the data voltages to the pixels PIX through the data lines. The data voltages may have voltage values corresponding to image gray levels which are to be realized in the pixels PIX. The data driver 12 may be configured with a plurality of source driver integrated circuits (ICs). When the DRD internal compensation method is applied, the number of gate lines for driving of the pixels PIX may decrease by half compared to a case where the DRD internal compensation method is not applied, and a size of the source driver IC which is to be connected to data lines may be reduced.

The source driver IC may include a shift register, a latch, a level shifter, a digital-to-analog converter (DAC), and an output buffer. The shift register may shift a clock input from the timing controller 11 to sequentially output a clock for sampling, the latch may sample and latch the digital image data DATA at a sampling clock timing sequentially input from the shift register to simultaneously output sampled pixel data, the level shifter may adjust a voltage of the pixel data, input from the latch, to within an input voltage range of the DAC, and the DAC may convert the pixel data from the level shifter into data voltages on the basis of a gamma compensation voltage and may supply the data voltages to the data lines through the output buffer.

The gate driver 13 may generate gate control signals on the basis of the gate timing control signal GDC and may supply the gate control signals to the gate lines. The gate driver 13 may include a plurality of gate drive ICs each including a gate shift register, a level shifter which shifts an output signal of the gate shift register to a swing width suitable for driving of a TFT of a pixel, and an output buffer. In the GIP type, the level shifter may be mounted on a printed circuit board (PCB), and the gate shift register may be provided in a bezel area which is a non-display area of the display panel 10.

The gate shift register may include a plurality of output stages which are connected to one another in a cascade type. The output stages may be independently connected to the gate lines and may output the gate control signals to the gate lines. The number of gate control signals and output stages for driving pixels PIX provided in one pixel line may be determined based on the number of gate lines corresponding thereto. In the DRD internal compensation method according to the present embodiment, some of the gate control signals may be connected to all pixels PIX of one pixel line and/or some pixels PIX of another pixel line, and thus, in proportion thereto, the number of gate lines and the number of gate control signals may be reduced. Also, in proportion to the reduction in the number of gate control signals, the number of output stages may also be reduced, and thus, a narrow bezel may be easily implemented.

The host system may act as an application processor (AP) in mobile devices, wearable devices, virtual/augmented reality devices, and the like. Also, the host system may be a main board for TV systems, set-top box, navigation systems, personal computers, and home theater systems, but is not limited thereto.

Figure 2:
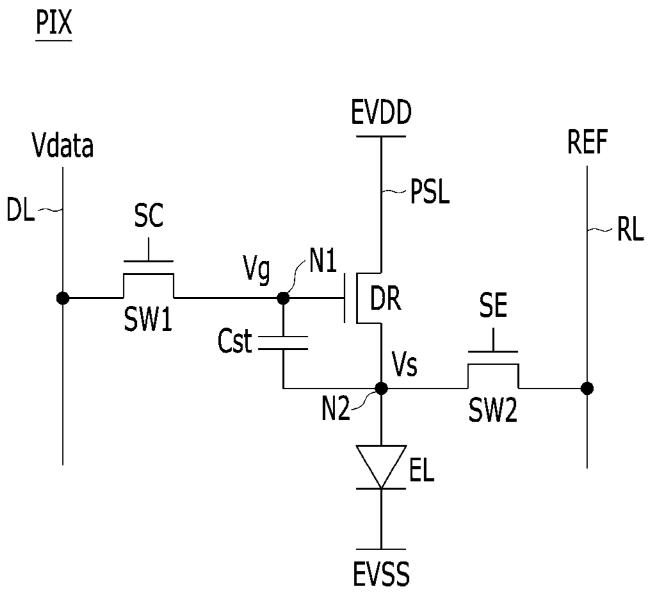
FIG. 2 is a diagram illustrating an equivalent circuit of one pixel provided in a display panel of FIG. 1.

FIG. 2 is a diagram illustrating an equivalent circuit of one pixel PIX provided in the display panel of FIG. 1.

Referring to FIG. 2, a pixel circuit may include a driving transistor DR, a light emitting device EL, and an internal compensator.

The driving transistor DR may generate a pixel current for driving the light emitting device EL. A gate electrode of the driving transistor DR may be connected to a first node N1, a first electrode (one of a source and a drain) thereof may be connected to an input terminal for a high level source voltage EVDD, and a second electrode (the other of the source and the drain) thereof may be connected to the light emitting device EL. The input terminal for the high level source voltage EVDD may be connected to a high level power line PSL and may be supplied with the high level source voltage EVDD through the high level power line PSL to transfer the high level source voltage EVDD to the first electrode of the driving transistor DR.

The light emitting device EL may include an anode electrode connected to a second node N2, a cathode electrode connected to the input terminal for the low level source voltage EVSS, and a light emitting layer disposed therebetween. The light emitting device EL may be implemented with an organic light emitting diode (OLED) including an organic light emitting layer, or may be implemented with an inorganic light emitting diode including an inorganic light emitting layer.

The internal compensator may be for compensating for a variation of a threshold voltage of the driving transistor DR and may be configured with two switching transistors (for example, first and second switching transistors) SW1 and SW2 and one storage capacitor Cst. In this case, at least some (for example, SW1) of a plurality of switching transistors may include an oxide transistor having a good off current characteristic so that a gate-source voltage "Vg-Vs" of the driving transistor DR is stably maintained.

The internal compensator may control voltages Vg and Vs of the first and second nodes N1 and N2 on the basis of switching operations of the first and second switching transistors SW1 and SW2 to reflect an electron mobility variation of the driving transistor DR in the gate-source voltage "Vg-Vs" of the driving transistor DR. Despite the electron mobility variation of the driving transistor DR, the internal compensator may compensate for the electron mobility variation so that the pixel current is not affected thereby. Accordingly, a compensation operation on the electron mobility variation of the driving transistor DR may be performed in a pixel.

Such an internal compensation operation should be differentiated from an external compensation operation of correcting the digital image data DATA on the basis of a threshold voltage variation of the driving transistor DR. The threshold voltage variation of the driving transistor DR may be sensed and compensated for through the external compensation operation. The electroluminescence display apparatus according to an embodiment of the present disclosure may further include a separate sensing circuit (which may also be referred to as a sensing unit) for sensing the threshold voltage variation of the driving transistor DR. The sensing unit and a reference voltage REF input terminal may be selectively connected to a reference voltage line RL. The sensing unit may sense a voltage or a current corresponding to the threshold voltage variation of the driving transistor DR through the reference voltage line RL and may digital-process the sensing value to supply a digital sensing value to an image data corrector. The image data corrector may correct the digital image data DATA which is to be applied to each pixel PIX, on the basis of the digital sensing value, and thus, may reduce or minimize image distortion caused by the threshold voltage variation of the driving transistor DR. The sensing unit may be embedded into the source driver IC and the image data corrector may be embedded into the timing controller 11, but the present embodiment is not limited thereto. The sensing unit and the image data corrector may be provided as one body in a separate chip type.

The internal compensation operation may be performed in a vertical active period where a data voltage Vdata for displaying an image is applied to the pixels PIX. On the other hand, the external compensation operation may be performed in at least one period of a vertical blank period where the data voltage Vdata is applied to the pixels PIX, a power-on sequence period before until a screen is turned on after a system power is turned on, and a power-off sequence period before until the system power is turned off after the screen is turned off.

The first switching transistor SW1 may be for applying the data voltage Vdata to the first node N1. A first electrode of the first switching transistor SW1 may be connected to a data line DL, and a second electrode thereof may be connected to the first node N1. Also, a gate of the first switching transistor SW1 may be connected to a first gate line. The first switching transistor SW1 may be turned on based on a first gate control signal SC from the first gate line.

The second switching transistor SW2 may be for applying the reference voltage REF to the second node N2. A first electrode of the second switching transistor SW2 may be connected to a reference voltage line RL, and a second electrode thereof may be connected to the second node N2. Also, a gate of the second switching transistor SW2 may be connected to a second gate line. The second switching transistor SW2 may be turned on based on a second gate control signal SE from the second gate line.

The storage capacitor Cst may be connected between the first node N1 and the second node N2 and may store and maintain the gate-source voltage "Vg-Vs" of the driving transistor DR determined based on a switching operation of each of the first and second switching transistors SW1 and SW2.

Figure 3:
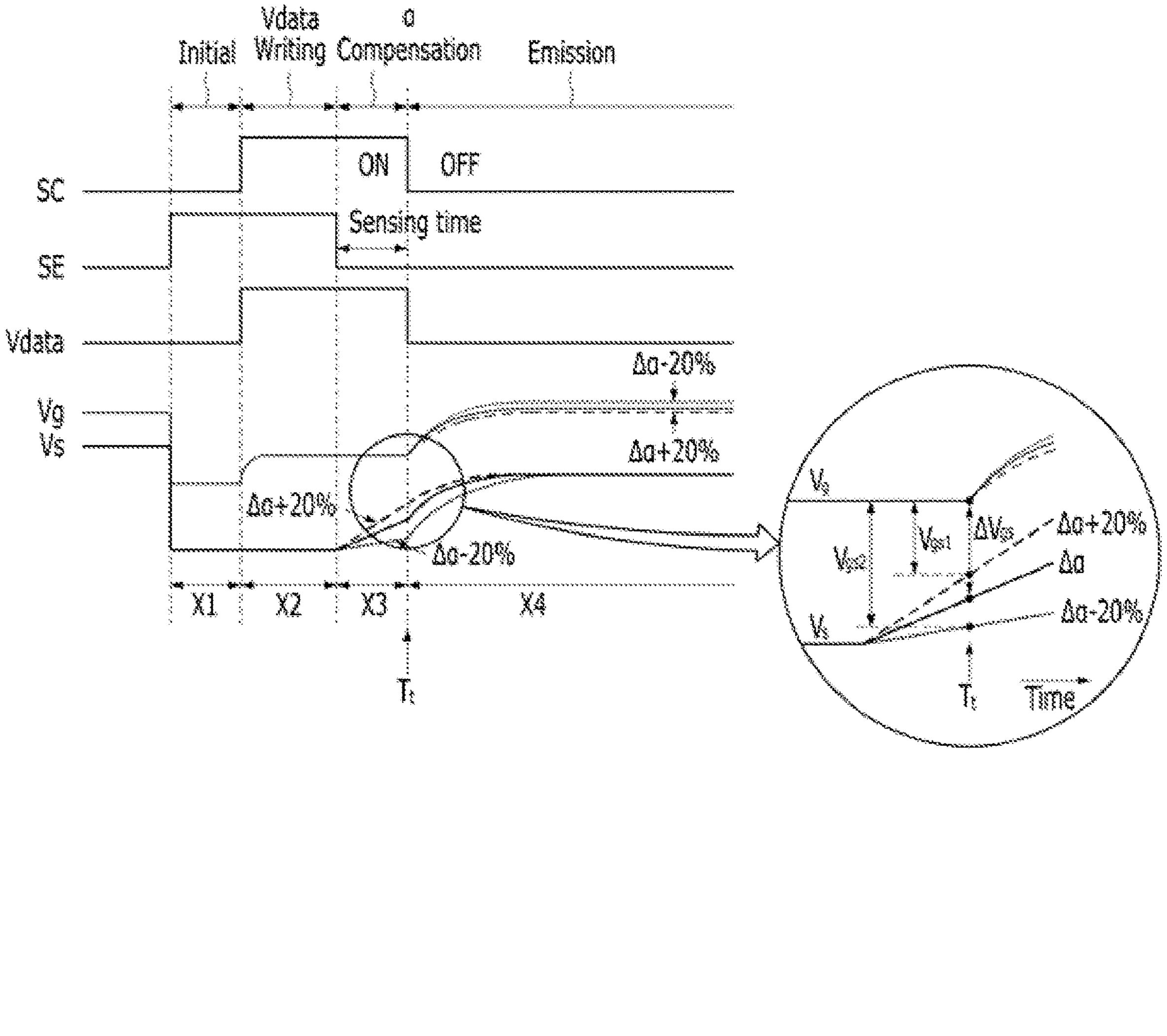
FIG. 3 is a diagram showing a driving timing of the pixel of FIG. 2.

FIG. 3 is a diagram showing a driving timing of the pixel of FIG. 2.

Referring to FIG. 3, the pixel driving timing may include first to fourth periods X1 to X4.

In the first period X1, the first node N1 may be floated, and the second node N2 may be initialized to the reference voltage REF. Accordingly, in some embodiments, the second switching transistor SW2 may be turned on based on the second gate control signal SE from the second gate line, and the second node N2 may be electrically connected to the reference voltage REF. In the first period X1, the first switching transistor SW1 may be turned off.

In the second period X2, the data voltage Vdata may be supplied to the first node N1. Accordingly, in some embodiments, the first switching transistor SW1 may be turned on based on the first gate control signal SC from the first gate line, and the first node N1 may be electrically connected to the data line DL. In the second period X2, the second switching transistor SW2 may maintain an on switching state, and thus, the second node N2 may maintain the reference voltage REF. In the second period X2, the driving transistor DR may satisfy a turn-on condition because "Vdata-REF," which is the gate-source voltage "Vg−Vs" thereof, is higher than a threshold voltage "Vth" thereof.

The third period X3 may be a period for reflecting an electron mobility variation of the driving transistor DR in the gate-source voltage "Vg−Vs." In the third period X3, the first switching transistor SW1 may maintain an on switching state and the second switching transistor SW2 may be turned off, and thus, the driving transistor DR may operate as a source follower. That is, in a state where a voltage "Vg" of the first node N1 is fixed to the data voltage Vdata, a voltage "Vs" of the second node N2 may increase from the reference voltage REF to the data voltage Vdata on the basis of a drain-source current of the driving transistor DR.

In the third period X3, the gate-source voltage "Vg−Vs" corresponding to the electron mobility of the driving transistor DR may be set based on a source follower operation of the driving transistor DR. A level of the gate-source voltage "Vg−Vs" based on the source follower operation may be set to be inversely proportional to a magnitude of the electron mobility, and thus, a brightness deviation based on an electron mobility deviation between pixels may be reduced.

For example, when the electron mobility of the driving transistor DR maintains an initial value "Δα" which is an initial setting value, the gate-source voltage "Vg−Vs" based on the source follower operation may be "ΔVgs." The electron mobility of the driving transistor DR may vary based on a panel temperature. When the electron mobility of the driving transistor DR is changed to a first value "Δα+20%" which is greater than the initial value "Δα," the gate-source voltage "Vg−Vs" based on the source follower operation may be "Vgs1" which is less than "ΔVgs." On the other hand, when the electron mobility of the driving transistor DR is changed to a second value "Δα−20%" which is less than the initial value "Δα," the gate-source voltage "Vg−Vs" based on the source follower operation may be "Vgs2" which is greater than "ΔVgs."

The fourth period X4 may be a period where the light emitting device EL emits light on the basis of the drain-source current of the driving transistor DR. In the fourth period X4, the first switching transistor SW1 may also be turned off, and thus, all of the first and second nodes N1 and N2 may be floated. In this state, the first and second nodes N1 and N2 may be coupled through the storage capacitor Cst, and thus, all of the voltage "Vg" of the first node N1 and the voltage "Vs" of the second node N2 may increase based on the drain-source current of the driving transistor DR. At this time, the gate-source voltage "Vg−Vs" of the driving transistor DR which is set in the third period X3 may be maintained. A voltage increase operation may be performed until the voltage "Vs" of the second node N2 reaches an operation point voltage of the light emitting device EL. When the voltage "Vs" of the second node N2 reaches the operation point voltage of the light emitting device EL, the light emitting device EL may be turned on and may emit light having brightness proportional to the pixel current (e.g., a drain-source current when the light emitting device EL is turned on). That is, the pixel current may be proportional to the square of the gate-source voltage "Vg−Vs" of the driving transistor DR which is set in the third period X3.

Based on such complementary principle, the gate-source voltage "Vg−Vs" may be automatically set based on the electron mobility variation of the driving transistor DR, and thus, a brightness deviation based on an electron mobility deviation may be compensated for. That is, the electron mobility variation may be reflected in the gate-source voltage "Vg−Vs" for determining the pixel current, and thus, the distortion of the pixel current caused by an electrical characteristic variation of the driving transistor DR may be reduced or minimized.

The above-described pixel configuration and basic driving timing may be applied to the following embodiments. Hereinafter, various methods for decreasing the number of gate lines when the DRD internal compensation method is applied are proposed.

First Embodiment

Figure 4:
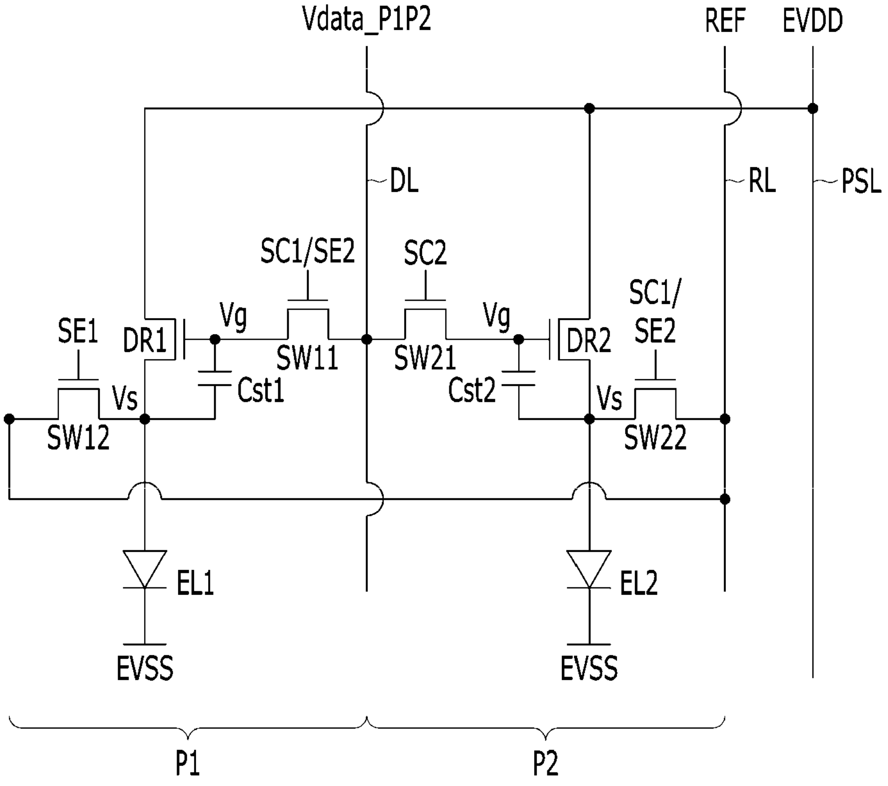
FIGS. 4 to 6 are diagrams illustrating a connection configuration between two pixels and signal lines driven based on a DRD internal compensation method according to a first embodiment of the present disclosure.
Figure 5:
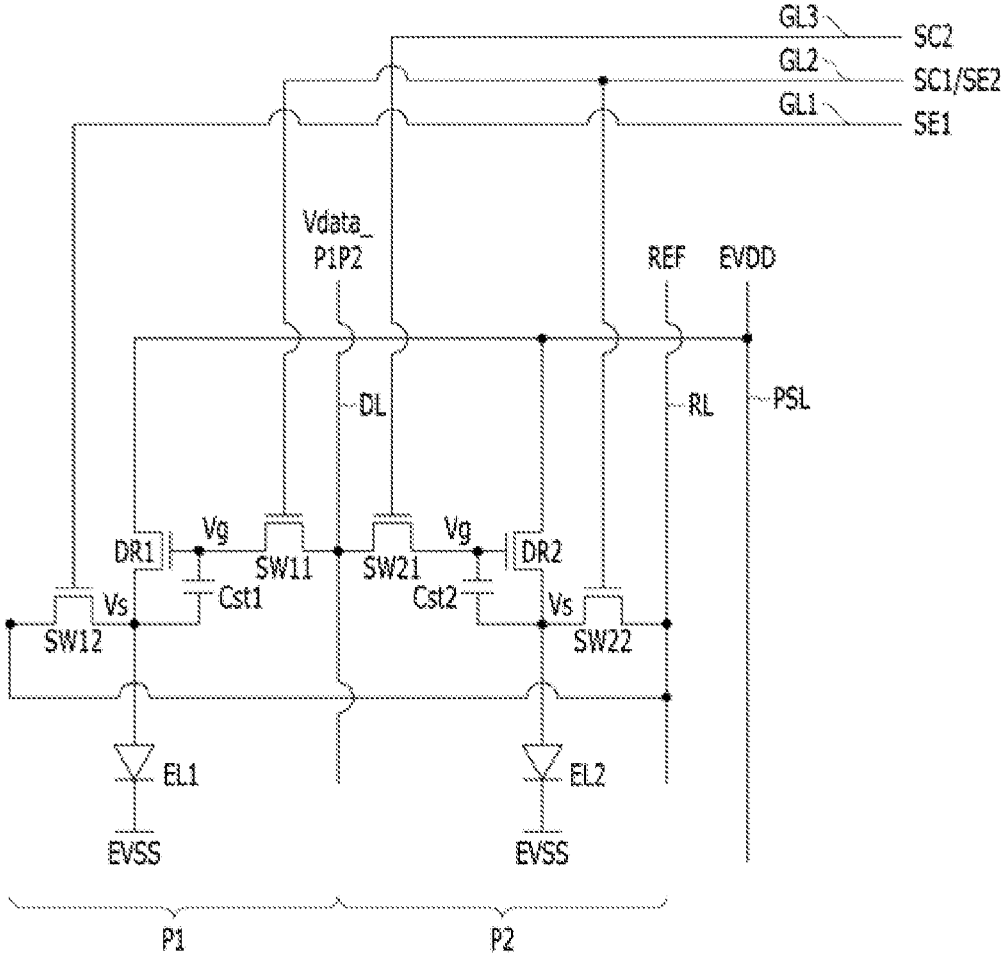
Figure 6:
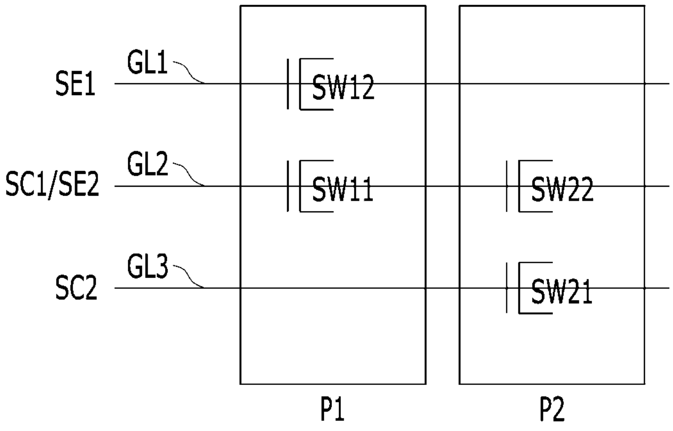

FIGS. 4 to 6 are diagrams illustrating a connection configuration between two pixels and signal lines (including a data line and a gate line) driven based on a DRD internal compensation method according to a first embodiment of the present disclosure.

Referring to FIGS. 4 and 5, in order to realize the DRD internal compensation method, two pixels (for example, first and second pixels) P1 and P2 according to the first embodiment may be disposed horizontally adjacent to each other with a data line DL therebetween to share the data line DL and may be time-divisionally driven.

The first pixel P1 may include a first light emitting device EL1 generating light of a first color, a first driving transistor DR1 which drives the first light emitting device EL1, a plurality of switching transistors SW11 and SW12 of a first group connected to the first driving transistor DR1, and a first storage capacitor Cst1 and may operate based on the method described above with reference to FIGS. 2 and 3.

The second pixel P2 may include a second light emitting device EL2 generating light of a second color, a second driving transistor DR2 which drives the second light emitting device EL2, a plurality of switching transistors SW21 and SW22 of a second group connected to the second driving transistor DR2, and a second storage capacitor Cst2 and may operate based on the method described above with reference to FIGS. 2 and 3.

In order to perform time-divisional driving, a case where the switching transistors SW11 and SW12 of the first group and the switching transistors SW21 and SW22 of the second group are connected to different gate lines (e.g., four gate lines) may be considered. However, such a method may cause an excessive increase in the number of gate lines compared to a non-DRD method where the switching transistors SW11 and SW12 of the first group and the switching transistors SW21 and SW22 of the second group are connected to two gate lines (e.g., SW11 and SW12 may be connected to a first gate line, and SW21 and SW22 may be connected to a second gate line).

Therefore, the electroluminescence display apparatus according to the first embodiment may be based on a method where the switching transistors SW11 and SW12 of the first group and the switching transistors SW21 and SW22 of the second group are connected to three gate lines (for example, first to third gate lines) GL1 to GL3, in order to perform time-divisional driving.

Accordingly, in some embodiments, the first gate line GL1 may be connected to the first pixel P1 to transfer a first gate control signal SE1 to the first pixel P1, and the second gate line GL2 may be connected to the first and second pixels P1 and P2 in common to transfer a second gate control signal SC1/SE2 to the first and second pixels P1 and P2. Also, the third gate line GL3 may be connected to the second pixel P2 to transfer a third gate control signal SC2 to the second pixel P2.

The first gate control signal SE1 may correspond to the reference voltage REF which is to be supplied to the first pixel P1, the second gate control signal SC1/SE2 may correspond to a first data voltage Vdata_P1 which is to be supplied to the first pixel P1 and may correspond to the reference voltage REF which is to be supplied to the second pixel P2, and the third gate control signal SC2 may be connected to a second data voltage Vdata_P2 which is to be supplied to the second pixel P2.

Referring to FIG. 6, in the DRD internal compensation method, because the first data voltage Vdata_P1 and the second data voltage Vdata_P2 should be respectively distributed in the first pixel P1 and the second pixel P2 through the same data line DL, pixel application timings thereof should be temporally divided. Otherwise, the first data voltage Vdata_P1 and the second data voltage Vdata_P2 may be mixed, and due to this, image distortion may occur.

Referring to FIG. 6, in the DRD internal compensation method, the reference voltage REF may be applied to the first pixel PX1 prior to the first data voltage Vdata_P1 and may be applied to the second pixel PX2 prior to the second data voltage Vdata_P2. A first timing at which the first data voltage Vdata_P1 is supplied to the first pixel P1 and a second timing at which the reference voltage REF is supplied to the second pixel P2 may be synchronized with each other on the basis of one gate control signal SC1/SE2. Accordingly, the switching transistors SW11 and SW12 of the first group and the switching transistors SW21 and SW22 of the second group may be driven by three gate control signals SE1, SC1/SE2, and SC2.

In the first embodiment, two switching transistors SW11 and SW12 may be simultaneously driven based on the second gate control signal SC1/SE2 supplied through the second gate line GL2, and thus, the number of gate lines, for the DRD internal compensation method, of pixels provided in one pixel line may decrease from four to three.

In the first and second pixels P1 and P2, a connection configuration between the three gate lines GL1 to GL3, a plurality of switching transistors, and a plurality of driving transistors will be described below in more detail.

The switching transistors SW11 and SW12 of the first group may include a first switching transistor SW11, which operates based on the second gate control signal SC1/SE2 from the second gate line GL2 to connect a gate of a first driving transistor DR1 to a data line DL, and a second switching transistor SW12 which operates based on the first gate control signal SE1 from the first gate line GL1 to connect a source of the first driving transistor DR1 to a reference voltage line RL.

The switching transistors SW21 and SW22 of the second group may include a third switching transistor SW21, which operates based on the third gate control signal SC2 from the third gate line GL3 to connect a gate of a second driving transistor DR2 to the data line DL, and a fourth switching transistor SW22 which operates based on the second gate control signal SC1/SE2 from the second gate line GL2 to connect a source of the second driving transistor DR2 to the reference voltage line RL.

The first to third gate lines GL1 to GL3 may be connected to a gate driver (13 of FIG. 1), and the data line DL and the reference voltage line RL may be connected to a data driver (12 of FIG. 1).

The gate driver 13 may generate the first gate control signal SE1 to supply the first gate control signal SE1 to the first gate line GL1, generate the second gate control signal SC1/SE2 to supply the second gate control signal SC1/SE2 to the second gate line GL2, and generate the third gate control signal SC2 to supply the third gate control signal SC2 to the third gate line GL3.

The data driver 12 may synchronize the reference voltage REF, which is to be supplied to the first pixel P1, with the first gate control signal SE1 having an on level to supply the reference voltage REF to the reference voltage line RL and may partially synchronize the first data voltage Vdata_P1, which is to be supplied to the first pixel P1, with the second gate control signal SC1/SE2 having an on level to supply the first data voltage Vdata_P1 to the data line DL. The data driver 12 may synchronize the reference voltage REF, which is to be supplied to the second pixel P2, with the second gate control signal SC1/SE2 having an on level to supply the reference voltage REF to the reference voltage line RL and may partially synchronize the second data voltage Vdata_P2, which is to be supplied to the second pixel P2, with the third gate control signal SC2 having an on level to supply the second data voltage Vdata_P2 to the data line DL.

Figure 7:
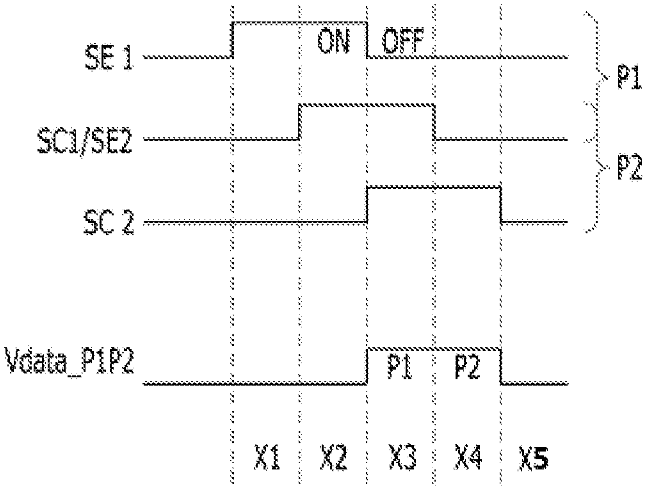
FIG. 7 is a diagram showing a driving timing of each of two pixels according to the first embodiment of the present disclosure.

FIG. 7 is a diagram showing a driving timing of each of two pixels P1 and P2 according to the first embodiment of the present disclosure.

Referring to FIG. 7, a driving timing of each of the first and second pixels P1 and P2 may include first to fifth periods X1 to X5. The first period X1, the second period X2, the third period X3, and the fourth period X4 may be sequentially arranged at a certain time interval (for example, a one-horizontal period interval).

In the first to fourth periods X1 to X4, first to third gate control signals SE1, SC1/SE2, and SC2 may have the same pulse width and may have phases which are sequentially delayed, and on level periods of two adjacent gate control signals may overlap by half each. Accordingly, in the first embodiment, internal compensation driving may be performed, and a simple operation skim of a gate driver may be realized.

All of the first to third gate control signals SE1, SC1/SE2, and SC2 may swing between an on level ON and an off level OFF and may have the same pulse amplitude. The first gate control signal SE1 may have an on level in only the first and second periods X1 and X2, the second gate control signal SC1/SE2 may have an on level in only the second and third periods X2 and X3, and the third gate control signal SC2 may have an on level in only the third and fourth periods X3 and X4. Also, all of the first to third gate control signals SE1, SC1/SE2, and SC2 may have an off level in the fifth period X5. Based on setting a timing of each of the first to third gate control signals SE1, SC1/SE2, and SC2, despite a reduction in the number of gate lines, the DRD internal compensation operation may be smoothly performed.

In the first to fourth periods X1 to X4, an operation of the first pixel P1 for DRD internal compensation driving may be substantially the same as the descriptions of FIGS. 2 and 3. Also, in the second to fifth periods X2 to X5, an operation of the second pixel P2 for DRD internal compensation driving may be substantially the same as the descriptions of FIGS. 2 and 3.

In order to increase the reliability of an internal compensation operation, the amount of RC delay of the first to third gate lines GL1 to GL3 may be the same. RC delay may denote a phenomenon where a charging and/or discharging time of a corresponding gate line are/is delayed by a resistance component and a capacitance component of the gate line.

In the first and second pixels P1 and P2, considering a connection between the three gate lines GL1 to GL3 and the switching transistors SW11, SW12, SW21, and SW22, the number of switching transistors connected to the second gate line GL2 may be more than the first gate line GL1 or the third gate line GL3. Accordingly, the amount of RC delay may be relatively large in the second gate line GL2. In order to decrease an RC delay amount deviation between the gate lines GL1 to GL3, a line width of the second gate line GL2 may be designed to be different from line widths of the first and third gate lines GL1 and GL3. Because a load (a switching transistor) connected to the second gate line GL2 is relatively greater than the first and third gate lines GL1 and GL3, the line width of the second gate line GL2 may be designed to be wider than that of each of the first and third gate lines GL1 and GL3. When a second line width of the second gate line GL2 is designed to be wider than a first line width of each of the first and third gate lines GL1 and GL3, an RC delay amount deviation in the first to third gate lines GL1 to GL3 may be reduced or minimized, and thus, the uniformity of internal compensation between the first and second pixels P1 and P2 may be secured.

Figure 8:
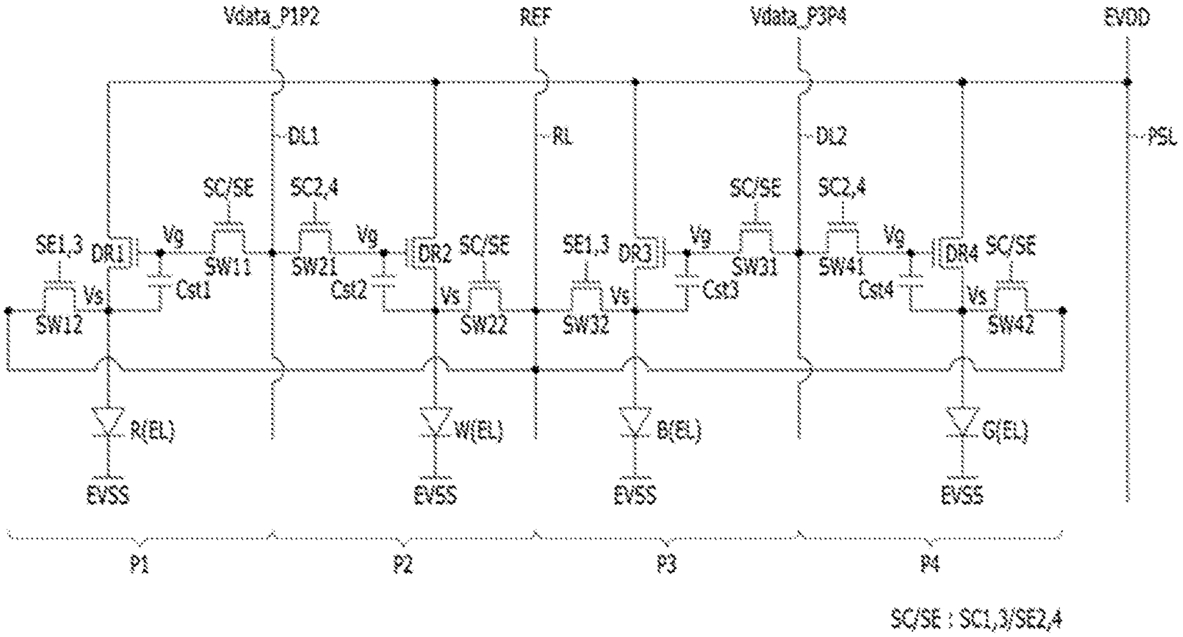
FIGS. 8 to 10 are diagrams illustrating an embodiment where the first embodiment of the present disclosure is applied to one unit pixel including four pixels.
Figure 9:
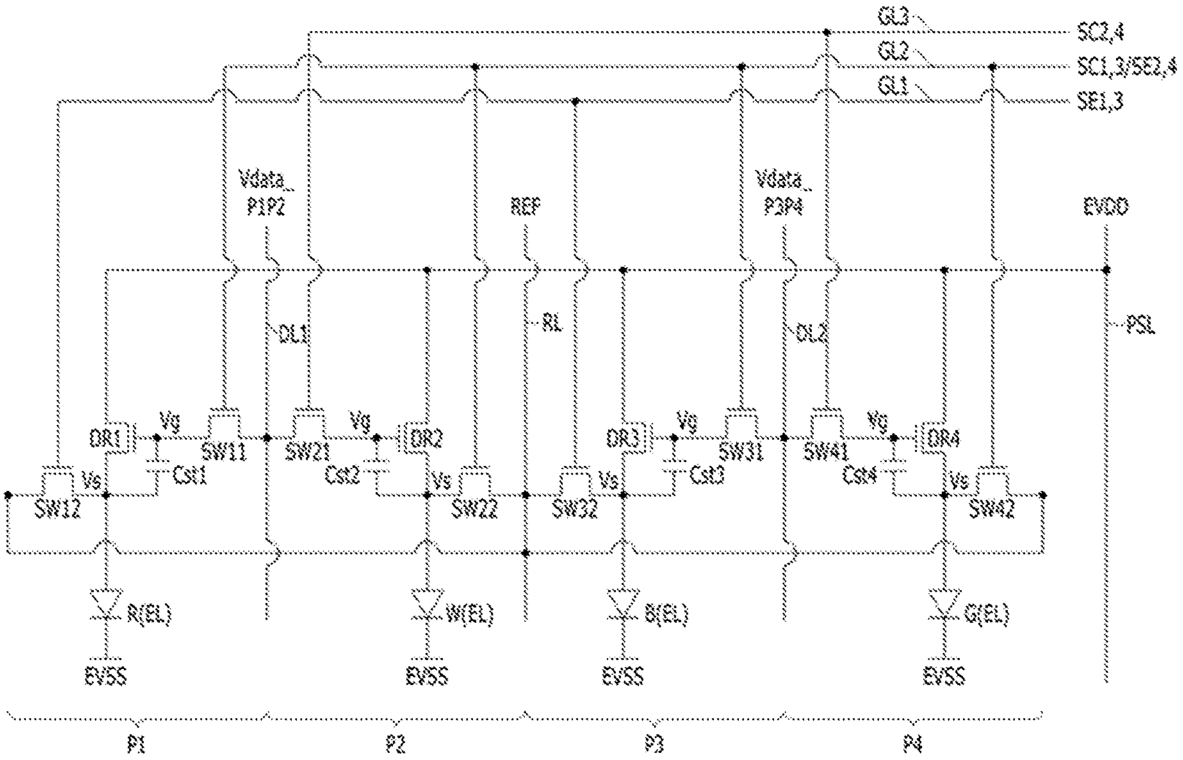
Figure 10:
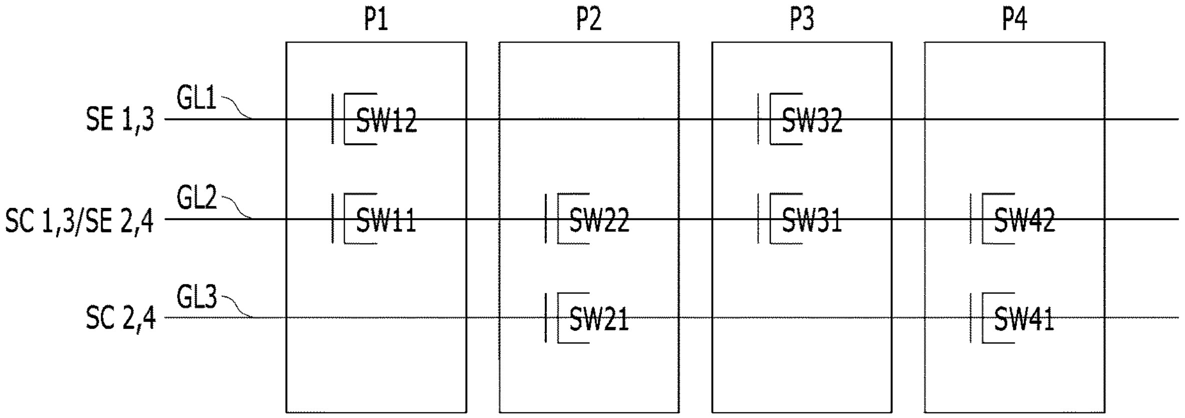

FIGS. 8 to 10 are diagrams illustrating an embodiment where the first embodiment of the present disclosure is applied to one unit pixel including four pixels.

Referring to FIGS. 8 and 9, one unit pixel may include first to fourth pixels P1 to P4 which are disposed adjacent to one another in a horizontal direction and share one reference voltage line RL. The first and second pixels P1 and P2 may be disposed adjacent to each other with a first data line DL1 therebetween to share the first data line DL1 and may be time-divisionally driven. Also, the third and fourth pixels P3 and P4 may be disposed adjacent to each other with a second data line DL2 therebetween to share the second data line DL2 and may be time-divisionally driven.

The first pixel P1 may include a first light emitting device EL1 having red (R), a first driving transistor DR1 which drives the first light emitting device EL1, a plurality of switching transistors SW11 and SW12 of a first group connected to the first driving transistor DR1, and a first storage capacitor Cst1.

The second pixel P2 may include a second light emitting device EL2 having white (W), a second driving transistor DR2 which drives the second light emitting device EL2, a plurality of switching transistors SW21 and SW22 of a second group connected to the second driving transistor DR2, and a second storage capacitor Cst2.

The third pixel P3 may include a third light emitting device EL3 having blue (B), a third driving transistor DR3 which drives the third light emitting device EL3, a plurality of switching transistors SW31 and SW32 of a third group connected to the third driving transistor DR3, and a third storage capacitor Cst3.

The fourth pixel P4 may include a fourth light emitting device EL4 having green (G), a fourth driving transistor DR4 which drives the fourth light emitting device EL4, a plurality of switching transistors SW41 and SW42 of a fourth group connected to the fourth driving transistor DR4, and a fourth storage capacitor Cst4.

The switching transistors SW11 and SW12 of the first group, the switching transistors SW21 and SW22 of the second group, the switching transistors SW31 and SW32 of the third group, and the switching transistors SW41 and SW42 of the fourth group may be connected to the three gate lines GL1 to GL3, and thus, in the DRD internal compensation method, the number of gate lines for time-divisional driving may be reduced.

The first gate line GL1 may be connected to the first and third pixels P1 and P3 to transfer a first gate control signal SE1,3 to the first and third pixels P1 and P3, and the third gate line GL3 may be connected to the second and fourth pixels P2 and P4 to transfer a third gate control signal SC2,4 to the second and fourth pixels P2 and P4. Also, the second gate line GL2 may be connected to the first to fourth pixels P1 to P4 in common to transfer a second gate control signal SC1,3/SE2,4 to the first to fourth pixels P1 to P4.

The first gate control signal SE1,3 may correspond to a reference voltage REF which is to be supplied to the first and third pixels P1 and P3. The second gate control signal SC1,3/SE2,4 may correspond to a first data voltage Vdata_P1 which is to be supplied to the first pixel P1 and may correspond to a third data voltage Vdata_P3 which is to be supplied to the third pixel P3. Also, the second gate control signal SC1,3/SE2,4 may correspond to the reference voltage REF which is to be supplied to the second and fourth pixels P2 and P4. The third gate control signal SC2,4 may correspond to a second data voltage Vdata_P2 which is to be supplied to the second pixel P2 and may correspond to a fourth data voltage Vdata_P4 which is to be supplied to the fourth pixel P4.

Referring to FIG. 10, in response to the first gate control signal SE1,3, the switching transistors SW12 and SW32 may be simultaneously turned on or off. In response to the second gate control signal SC1,3/SE2,4, the switching transistors SW11, SW31, SW22, and SW42 may be simultaneously turned on or off. Also, in response to the third gate control signal SC2,4, the switching transistors SW21 and SW41 may be simultaneously turned on or off.

As described above, a gate line for supplying the second gate control signal SC1,3/SE2,4 to the first to fourth pixels P1 to P4 may be provided as one gate line. As a result, the number of gate lines, for the DRD internal compensation method, of pixels provided in one pixel line may decrease from four to three.

In the first and second pixels P1 and P2, a connection configuration between three gate lines GL1 to GL3, a plurality of switching transistors, and a plurality of driving transistors may be substantially the same as the descriptions of FIGS. 4 and 5, and thus, its description is omitted. Also, in the third and fourth pixels P3 and P4, a connection configuration between three gate lines GL1 to GL3, a plurality of switching transistors, and a plurality of driving transistors may be similar to the descriptions of FIGS. 4 and 5, and thus, its description is omitted.

Figure 11:
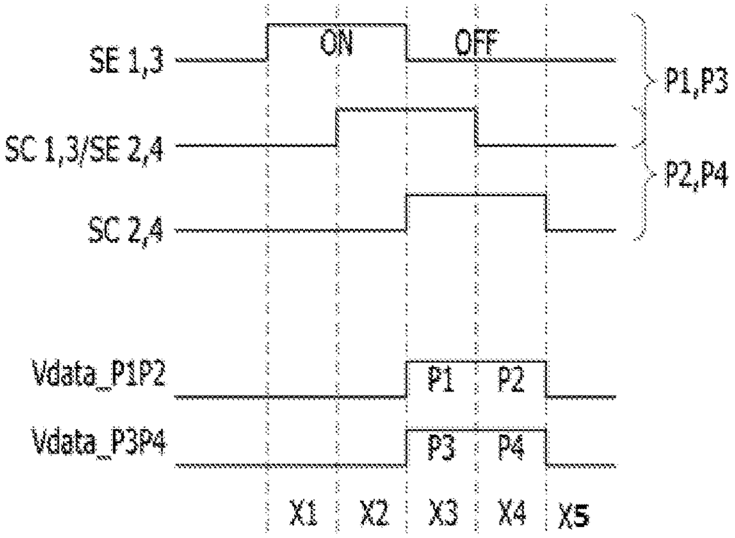
FIG. 11 is a diagram showing a driving timing of each of four pixels according to the first embodiment of the present disclosure.

FIG. 11 is a diagram showing a driving timing of each of four pixels according to the first embodiment of the present disclosure.

Comparing with FIG. 7, FIG. 11 may have differences such as i) a feature where first and third pixels P1 and P3 simultaneously operate based on a first gate control signal SE1,3, ii) a feature where first to fourth pixels P1 to P4 simultaneously operate based on a second gate control signal SC1,3/SE2,4, iii) a feature where second and fourth pixels P2 and P4 simultaneously operate based on a third gate control signal SC2,4, and iv) a feature where first and third data voltages Vdata_P1P3 may be synchronized with the second gate control signal SC1,3/SE2,4 and second and fourth data voltages Vdata_P2P4 may be synchronized with the third gate control signal SC2,4.

Second Embodiment

Figure 12:
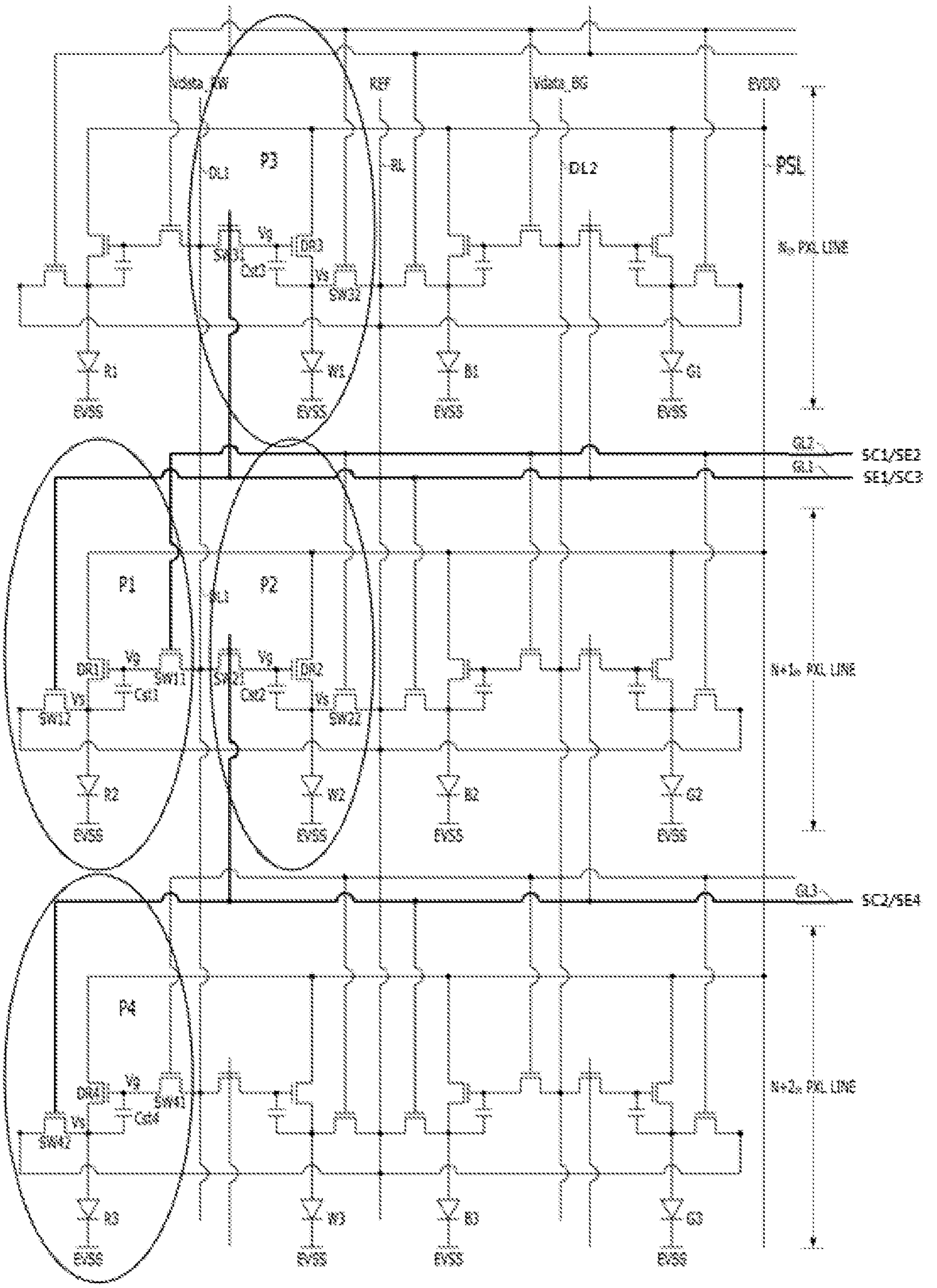
FIGS. 12 to 14 are diagrams illustrating a connection configuration between twelve pixels and signal lines distributed and disposed in three pixel lines according to a second embodiment of the present disclosure.
Figure 13:
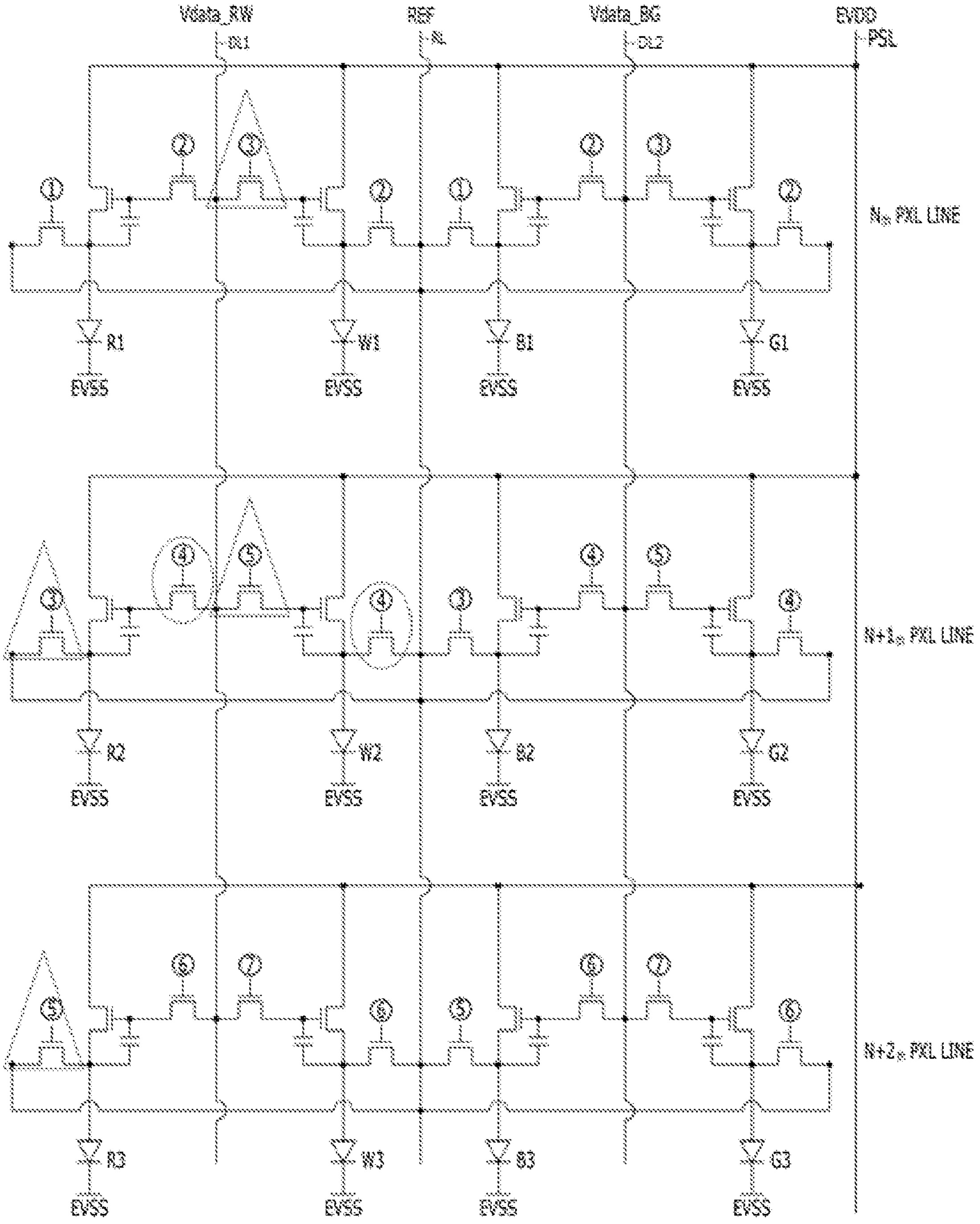
Figure 14:
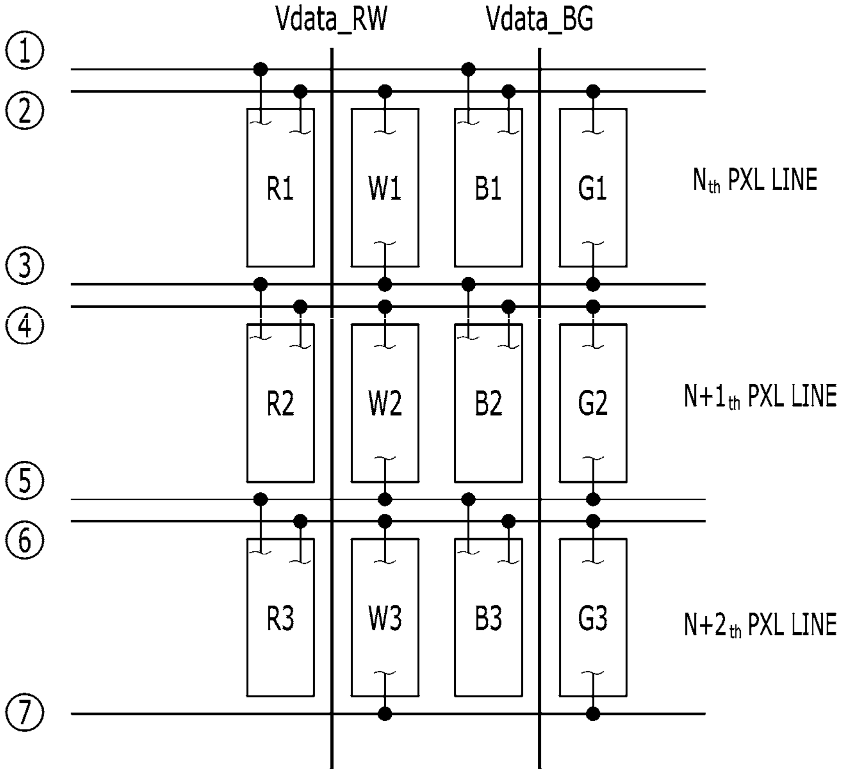

FIGS. 12 to 14 are diagrams illustrating a connection configuration between twelve pixels and signal lines distributed and disposed in three pixel lines according to a second embodiment of the present disclosure.

Referring to FIGS. 12 to 14, in the second embodiment, the number of gate lines for the DRD internal compensation method may be more reduced based on a connection configuration where four pixels (for example, first to fourth pixels) P1 to P4 adjacent to one another in a horizontal direction and a vertical direction are connected to three gate lines.

Particularly, in the second embodiment, the first and second pixels P1 and P2 adjacent to each other in the horizontal direction may share a second gate line GL2, the second and third pixels P2 and P3 adjacent to each other in the vertical direction may share a first gate line GL1, and the first and fourth pixels P1 and P4 adjacent to each other in the vertical direction may share a third gate line GL3, and thus, an RC delay amount deviation in the first to third gate lines GL1 to GL3 may be reduced or minimized, thereby securing the uniformity of internal compensation between the first to fourth pixels P1 to P4.

The four pixels P1 to P4 may include the first pixel P1, the second pixel P2, the third pixel P3, and the fourth pixel P4, which share a data line DL1 and a reference voltage line RL.

The first pixel P1 and the second pixel P2 may be disposed adjacent to each other in the horizontal direction with the data line DL1 therebetween and may be disposed on an n+1$^{th}$ pixel line. The first pixel P1 may be charged with a first data voltage Vdata_R2 and a reference voltage REF. Also, the second pixel P2 may be charged with a second data voltage Vdata_W2 and the reference voltage REF.

The third pixel P3 may be disposed adjacent to the second pixel P2 in a first vertical direction and may share the data line DL1 and a reference voltage line RL along with the second pixel P2. The third pixel P3 may be disposed on an n$^{th}$ pixel line. The third pixel P3 may be charged with a third data voltage Vdata_W1 and the reference voltage REF.

The fourth pixel P4 may be disposed adjacent to the first pixel P1 in a second vertical direction opposite to the first vertical direction and may share the data line DL1 and the reference voltage line RL along with the first pixel P1. The fourth pixel P4 may be disposed on an n+2$^{th}$ pixel line. The fourth pixel P4 may be charged with a fourth data voltage Vdata_R3 and the reference voltage REF.

Moreover, the third and fourth pixels P3 and P4 may be disposed not to be adjacent to each other.

The four pixels P1 to P4 may be connected to three gate lines GL1 to GL3 so as to be supplied with first to third gate control signals SE1/SC3, SC1/SE2, and SC2/SE4. The first to third gate control signals SE1/SC3, SC1/SE2, and SC2/SE4 may have different phases. A phase of the first gate control signal SE1/SC3 may be fastest, a phase of the second gate control signal SC1/SE2 may be second fast, and a phase of the third gate control signal SC2/SE4 may be latest.

The first gate line GL1 may be connected to the first and third pixels P1 and P3 and may supply the first gate control signal SE1/SC3 to the first and third pixels P1 and P3. The first gate control signal SE1/SC3 may be synchronized with a timing at which the reference voltage REF is supplied to the first pixel P1, and simultaneously, may be partially synchronized with a timing at which the third data voltage Vdata_W1 is supplied to the third pixel P3.

The second gate line GL2 may be connected to the first and second pixels P1 and P2 and may supply the second gate control signal SC1/SE2 to the first and second pixels P1 and P2. The second gate control signal SC1/SE2 may be partially synchronized with a timing at which the first data voltage Vdata_R2 is supplied to the first pixel P1, and simultaneously, may be synchronized with a timing at which the reference voltage REF is supplied to the second pixel P2.

The third gate line GL3 may be connected to the second and fourth pixels P2 and P4 and may supply the third gate control signal SC2/SE4 to the second and fourth pixels P2 and P4. The third gate control signal SC2/SE4 may be partially synchronized with a timing at which the second data voltage Vdata_W2 is supplied to the second pixel P2, and simultaneously, may be synchronized with a timing at which the reference voltage REF is supplied to the fourth pixel P4.

In the four pixels P1 to P4, the number of switching transistors connected to each of the first to third gate lines GL1 to GL3 may identically be two each. Accordingly, loads applied to the first to third gate lines GL1 to GL3 may be the same. As a result, an RC delay deviation between the first to third gate lines GL1 to GL3 may be reduced or minimized.

Serial numbers illustrated in FIGS. 13 and 14 represent a driving order in which switching transistors are driven. As seen based thereon, switching transistors SW12 and SW31 may simultaneously operate at a driving timing ③, switching transistors SW11 and SW22 may simultaneously operate at a driving timing ④, and switching transistors SW21 and SW42 may simultaneously operate at a driving timing ⑤.

Figure 15:
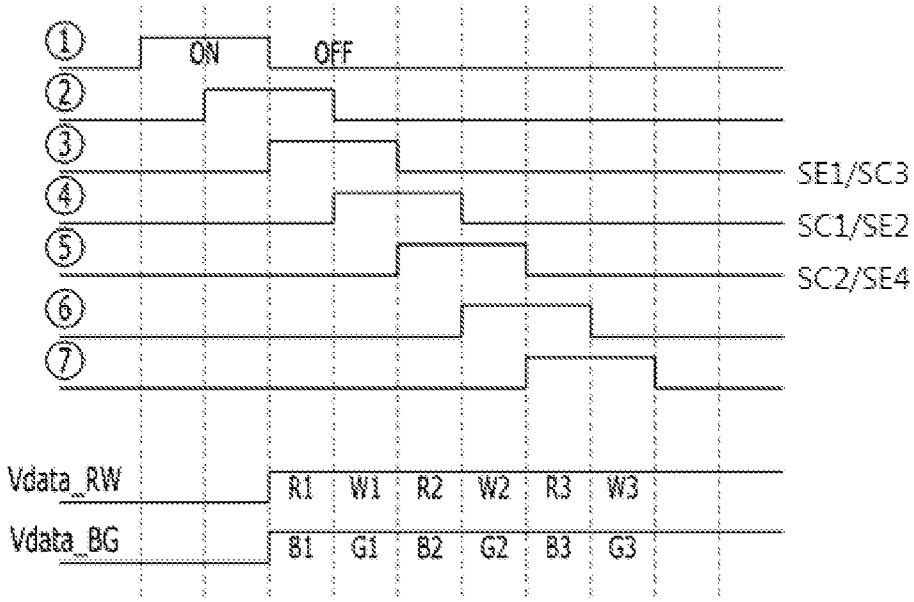
FIG. 15 is a diagram for describing a driving timing of each of twelve pixels distributed and disposed in the three pixel lines.

FIG. 15 is a diagram for describing a driving timing of each of twelve pixels distributed and disposed in the three pixel lines.

Referring to FIG. 15, as in FIG. 12, twelve pixels share the same data line and share gate lines by units of four pixels adjacent to one another in a horizontal direction and a vertical direction. As a result, the number of gate lines for driving the twelve pixels in the DRD internal compensation method are reduced to seven. Serial numbers in FIG. 15 are a driving order in which switching transistors included in the twelve pixels are driven, and the number of serial numbers is the same as the number of gate lines.

Gate control signals corresponding to serial numbers ③, ④, and ⑤ correspond to the first to third gate control signals SE1/SC3, SC1/SE2, and SC2/SE4 described above. Referring to this, a first pulse of the first gate control signal SE1/SC3 has a first phase, a second pulse of the second gate control signal SC1/SE2 has a second phase which is later than the first phase, and a third pulse of the third gate control signal SC2/SE4 has a third phase which is later than the second phase. Also, the first pulse and the second pulse overlap by half each, the second pulse and the third pulse overlap by half each, and the first pulse does not overlap the third pulse.

Moreover, in a case where the DRD internal compensation is implemented based on a gate line non-sharing method of the related art, the number of gate lines for driving twelve pixels may be twelve and may be large. In the present embodiment illustrated in FIG. 15, because the number of gate lines for driving twelve pixels is seven, the number of gate lines may further decrease by five compared to the related art.

The embodiments of the present disclosure may realize the following effects.

The embodiments of the present disclosure may be implemented so that some gate lines are shared by units of two pixels adjacent to each other in a horizontal direction in the DRD internal compensation method, thereby decreasing a panel design limitation and a bezel size. In this case, in the embodiments of the present disclosure, a line width of a gate line may be differentially designed, and thus, the number of gate lines may decrease in the DRD internal compensation method, thereby reducing an RC delay deviation caused by a decrease in the number of gate lines in the DRD internal compensation method and increasing the accuracy and reliability of internal compensation.

Furthermore, the embodiments of the present disclosure may be implemented so that some gate lines are shared by units of four pixels adjacent to each other in a horizontal direction and a vertical direction in the DRD internal compensation method, thereby decreasing the number of gate lines and removing an RC delay deviation. In the embodiments of the present disclosure, a panel design may be limited, a bezel size may be reduced, and the accuracy and reliability of internal compensation may increase.

The effects according to the present disclosure are not limited to the above examples, and other various effects may be included in the specification.

The effects according to the present disclosure are not limited while the present disclosure has been particularly shown and described with reference to embodiments thereof, it will be understood by those of ordinary skill in the art that various changes in form and details may be made therein without departing from the spirit and scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electroluminescence display apparatus comprising:

a first pixel;

a second pixel disposed adjacent to the first pixel;

a shared data line electrically connected to both the first pixel and the second pixel, the shared data line configured to time-divisionally supply a first data voltage and a second data voltage;

a shared reference voltage line directly, electrically connected to both the first pixel and the second pixel, the shared reference voltage line configured to supply a reference voltage;

a first gate line electrically connected to the first pixel to transfer a first gate control signal;

a second gate line electrically connected to the first and second pixels in common to transfer a second gate control signal;

a third gate line electrically connected to the second pixel to transfer a third gate control signal; and a gate driver electrically connected to the first, second, and third gate lines, wherein each of the first and second gate lines has a first line width, and the third gate line has a second line width which differs from the first line width, wherein the second gate line is commonly connected to a gate electrode of a first switching element in the first pixel and a gate electrode of a second switching element in the second pixel, wherein the first switching element is electrically connected between a gate electrode of a first driving element of the first pixel and the shared data line, wherein the second switching element is electrically connected between a source or a drain electrode of a second driving element of the second pixel and the shared reference voltage line, wherein the gate driver is configured to:

generate the first gate control signal to supply the first gate control signal to the first gate line, generate the second gate control signal to supply the second gate control signal to the second gate line, and generate the third gate control signal to supply the third gate control signal to the third gate line, wherein the shared data line supplies the first data voltage to the first pixel during a third period and supplies the second data voltage to the second pixel during a fourth period, wherein a period when the third gate control signal has an on level overlaps with the third period and the fourth period, and wherein a period when the first gate control signal has an on level does not overlap with the third period and the fourth period.

2. The electroluminescence display apparatus of claim 1, wherein the first pixel comprises a first light emitting device generating light of a first color, the first driving element driving the first light emitting device, a plurality of switching elements of a first group coupled to the first driving element, and a first storage capacitor, and the second pixel comprises a second light emitting device generating light of a second color which differs from the first color, the second driving element driving the second light emitting device, a plurality of switching elements of a second group coupled to the second driving element, and a second storage capacitor.

3. The electroluminescence display apparatus of claim 2, wherein the plurality of switching elements of the first group comprises:

the first switching element; and a third switching element operating based on the first gate control signal to connect a source of the first driving element to the shared reference voltage line, and the plurality of switching elements of the second group comprises:

the second switching element; and a fourth switching element operating based on the third gate control signal to connect a gate of the second driving element to the shared data line.

4. The electroluminescence display apparatus of claim 1, wherein the second line width is wider than the first line width.

5. The electroluminescence display apparatus of claim 1, wherein the third period and the fourth period is for one-horizontal period interval, respectively.

6. An electroluminescence display apparatus comprising:

a first pixel;

a second pixel disposed adjacent to the first pixel in a horizontal direction to share a data line to which a first data voltage and a second data voltage are time-divisionally supplied and a reference voltage line to which a reference voltage is supplied, along with the first pixel;

a first gate line coupled to the first pixel to transfer a first gate control signal, corresponding to the reference voltage, to the first pixel;

a second gate line coupled to the first and second pixels in common to transfer a second gate control signal, corresponding to the first data voltage and the reference voltage in common, to the first and second pixels;

a third gate line coupled to the second pixel to transfer a third gate control signal, corresponding to the second data voltage, to the second pixel;

a gate driver coupled to the first to third gate lines; and a data driver coupled to the data line, wherein each of the first and second gate lines has a first line width, and the third gate line has a second line width which differs from the first line width, wherein the gate driver generates the first gate control signal to supply the first gate control signal to the first gate line, generates the second gate control signal to supply the second gate control signal to the second gate line, and generates the third gate control signal to supply the third gate control signal to the third gate line, and the data driver synchronizes the reference voltage, which is to be supplied to the first pixel, with the first gate control signal having an on level to supply the reference voltage to the reference voltage line, partially synchronizes the first data voltage, which is to be supplied to the first pixel, with the second gate control signal having an on level to supply the first data voltage to the data line, synchronizes the reference voltage, which is to be supplied to the second pixel, with the second gate control signal having an on level to supply the reference voltage to the reference voltage line, and partially synchronizes the second data voltage, which is to be supplied to the second pixel, with the third gate control signal having an on level to supply the second data voltage to the data line.

7. An electroluminescence display apparatus comprising:

a first pixel;

a second pixel disposed adjacent to the first pixel in a horizontal direction to share a data line to which a first data voltage and a second data voltage are time-divisionally supplied and a reference voltage line to which a reference voltage is supplied, along with the first pixel;

a first gate line coupled to the first pixel to transfer a first gate control signal, corresponding to the reference voltage, to the first pixel;

a second gate line coupled to the first and second pixels in common to transfer a second gate control signal, corresponding to the first data voltage and the reference voltage in common, to the first and second pixels; and a third gate line coupled to the second pixel to transfer a third gate control signal, corresponding to the second data voltage, to the second pixel, wherein each of the first and second gate lines has a first line width, and the third gate line has a second line width which differs from the first line width, and wherein, in a first period, a second period, a third period, and a fourth period sequentially arranged at a certain time interval, the first to third gate control signals have identical pulse width and have phases which are sequentially delayed, and on level periods of two adjacent gate control signals overlap by half each.

8. The electroluminescence display apparatus of claim 7, wherein the first gate control signal has an on level in only the first and second periods, the second gate control signal has an on level in only the second and third periods, and the third gate control signal has an on level in only the third and fourth periods.

* * * * *